(12) United States Patent
Yu et al.

(10) Patent No.: US 12,011,702 B2
(45) Date of Patent: Jun. 18, 2024

(54) SYSTEM AND METHOD FOR PREPARING ULTRAFINE SILICA BY LEACHING SILICATE ORE USING HYDROGEN CHLORIDE GAS

(71) Applicant: YUANCHU TECHNOLOGY (BEIJING) CO., LTD., Beijing (CN)

(72) Inventors: Changjun Yu, Beijing (CN); Qi Wang, Beijing (CN)

(73) Assignee: YUANCHU TECHNOLOGY (BEIJING) CO., LTD., Beijing (CN)

( * ) Notice: Subject to any disclaimer, the term of this patent is extended or adjusted under 35 U.S.C. 154(b) by 413 days.

(21) Appl. No.: 17/602,407

(22) PCT Filed: Aug. 12, 2019

(86) PCT No.: PCT/CN2019/100145
§ 371 (c)(1),
(2) Date: Oct. 8, 2021

(87) PCT Pub. No.: WO2020/206892
PCT Pub. Date: Oct. 15, 2020

(65) Prior Publication Data
US 2022/0204352 A1    Jun. 30, 2022

(30) Foreign Application Priority Data

Apr. 8, 2019 (CN) .......................... 201910275773.3

(51) Int. Cl.
*B01J 19/18* (2006.01)
*B01D 11/02* (2006.01)
(Continued)

(52) U.S. Cl.
CPC ......... *B01J 19/1881* (2013.01); *B01D 11/028* (2013.01); *B01D 21/26* (2013.01);
(Continued)

(58) Field of Classification Search
CPC .......... B01J 19/1881; B01J 2219/00103; B01J 2219/00108; B01J 19/1868;
(Continued)

(56) References Cited

U.S. PATENT DOCUMENTS 3,130,033 A * 4/1964 Stephens ............... C01B 25/405
71/51
5,780,005 A 7/1998 Olerud
(Continued)

FOREIGN PATENT DOCUMENTS

CN    1133586 A    10/1996
CN    101249965 A    8/2008
(Continued)

OTHER PUBLICATIONS

Extended European search report for European Patent Application No. 19924491.4, dated Aug. 8, 2023, 7 pages.
(Continued)

*Primary Examiner* — Joseph W Drodge
(74) *Attorney, Agent, or Firm* — Westman, Champlin & Koehler, P.A.

(57) ABSTRACT

Provided is a system and a method for preparing ultrafine silica by leaching silicate ore using hydrogen chloride gas, comprising an ore raw material feeding device, an ejector, a stirring tank and a liquid-solid separation device. A circulated material outlet of a stirred tank is connected with a liquid inlet of an ejector through a circulation pipe; a liquid outlet of the ejector is connected with a circulated material inlet of the stirred tank; a material outlet of a raw ore feeding apparatus is connected with the circulation pipe; and the circulated material outlet of the stirred tank is connected with a solid-liquid separation apparatus. Based on the system and method in the present disclosure, an industrially feasible solution for preparing silica by continuously leach-
(Continued)

ing a silicate ore is provided. The dissolution efficiency of ores and the utilization of hydrochloric acid are greatly increased.

8 Claims, 2 Drawing Sheets

(51) Int. Cl.
    *B01D 21/26*     (2006.01)
    *B01D 36/00*     (2006.01)
    *C01B 33/193*     (2006.01)

(52) U.S. Cl.
    CPC ............ *B01D 36/00* (2013.01); *C01B 33/193* (2013.01); *B01J 2219/00103* (2013.01); *B01J 2219/00108* (2013.01); *C01P 2004/61* (2013.01); *C01P 2006/12* (2013.01)

(58) Field of Classification Search
    CPC ... B01J 2219/00891; B01J 2219/00905; C01B 33/193; C01B 33/14; C01B 33/141; C01B 33/142; C01B 33/143; C01B 33/18; C01B 33/187; C01P 2004/61; C01P 2006/12; C01P 2006/19; C01P 2006/32; C01P 2004/62; C01P 2004/64; B01D 11/02; B01D 11/0215; B01D 11/0219; B01D 11/028; B01D 11/0288; B01D 21/00; B01D 21/24; B01D 21/26; B01D 21/262; B01D 21/267; B01D 36/00; B01D 36/04; B01D 36/045; B01D 37/00
See application file for complete search history.

(56) References Cited

U.S. PATENT DOCUMENTS

| | | | |
|---|---|---|---|
| 6,506,361 B1 | 1/2003 | Machado et al. | |
| 10,695,806 B2 | 6/2020 | Wei et al. | |
| 2002/0197194 A1 | 12/2002 | Machado et al. | |
| 2003/0003035 A1* | 1/2003 | Stamires | B01J 19/10 422/224 |
| 2003/0132420 A1* | 7/2003 | Yadav | C09K 3/1409 252/79.1 |
| 2009/0169456 A1 | 7/2009 | Yang et al. | |
| 2011/0206746 A1* | 8/2011 | Hagar | A61K 6/70 424/49 |
| 2016/0107938 A1* | 4/2016 | Mäder | C01B 33/24 106/713 |
| 2018/0056344 A1 | 3/2018 | Wei et al. | |
| 2018/0141820 A1* | 5/2018 | Zhang | C01B 33/18 |
| 2020/0361781 A1 | 11/2020 | Wang | |

FOREIGN PATENT DOCUMENTS

| | | | |
|---|---|---|---|
| CN | 101312908 A | 11/2008 | |
| CN | 106348331 A | 1/2017 | |
| CN | 107720800 A | 2/2018 | |
| CN | 109850911 A | 6/2019 | |
| EP | 1 155 738 A2 | 11/2011 | |
| EP | 2474390 A1 * | 7/2012 | ............ B01F 5/0206 |
| GB | 460 410 A | 1/1937 | |
| JP | H04-224107 A | 8/1992 | |
| WO | 2007/064053 A1 | 6/2007 | |

OTHER PUBLICATIONS

International Search and Written Opinion for International Application No. PCT/CN2019/100145, mailed on Jan. 2, 2020, 15 pages.

\* cited by examiner

SYSTEM AND METHOD FOR PREPARING ULTRAFINE SILICA BY LEACHING SILICATE ORE USING HYDROGEN CHLORIDE GAS

CROSS-REFERENCE TO RELATED APPLICATIONS

This application is a Section 371 National Stage application of International Application No. PCT/CN2019/100145, filed on 12 Aug. 2019, which published as WO 2020206892 A1, on 15 Oct. 2020, which claims priority to Chinese Patent Application No. 201910275773.3, filed on Apr. 8, 2019, and entitled "system and method for preparing ultrafine silica by leaching silicate ore using hydrogen chloride gas", the contents of which are incorporated herein by reference in their entireties.

FIELD OF TECHNOLOGY

The present disclosure relates to a system and a method for preparing ultrafine silica by leaching a silicate ore using hydrogen chloride gas, and relates to the field of inorganic non-metallic materials.

BACKGROUND

Ultrafine $SiO_2$ has characteristics of a large specific surface area, being porous, high-temperature resistance, strong electrical insulation, good reinforcement, and non-combustion, and is widely applied to fields, such as coatings, plastics, medicine, biology, papermaking, rubber, agriculture, chemical industry, national defense, and machinery. There are many types of production processes for producing ultrafine $SiO_2$, based on the basic principle, the production processes are classified into only a vapor phase method and a precipitation method. Due to a simple process, stable production conditions, low costs, and a large output, the precipitation method is currently widely used in industrial production. At present, the precipitation method is further classified into a traditional precipitation method and a new precipitation method, and the new precipitation method is also referred to as a dissociation method. Compared with the traditional precipitation method, in the dissociation method, the traditional water glass is no longer used as a silicon source, and instead, a non-metallic ore and a derivative of the non-metallic ore or another substance is mainly used as the silicon source. A key to a technology of the dissociation method is conversion of crystallographic silica and silicate to amorphous-state silica. According to different used raw materials, the dissociation method may be classified into a non-metallic ore method, a gramineous plant method, a by-product recovery method, and the like.

The dissociation method using a non-metallic ore as a raw material is roughly classified into two methods. In one method, the raw material is leached by using a sodium hydroxide solution, to obtain a sodium silicate solution, and then the sodium silicate solution is acidified by using hydrochloric acid to obtain the ultrafine $SiO_2$. In the other method, the raw material is directly leached by using a hydrochloric acid solution or a mixed acid solution to obtain the ultrafine $SiO_2$. However, at present, most research stays in an experimental research stage, and a leaching reaction between a silicate ore and acid is slow, an environment with a high temperature and strong acid is required, and high-concentration hydrochloric acid volatilizes at a high temperature.

SUMMARY

The present disclosure is to provide a system and a method for preparing ultrafine silica by leaching a silicate ore using hydrogen chloride gas. In the present disclosure, a manner in which the HCL directly dissolves is used, acid concentration is high, and activity is strong. In addition, dissolution heat may be supplied for a leaching process.

The ultrafine silica used in the present disclosure is silica having a particle size of 10 μm to 15 μm.

A system that is provided in the present disclosure and that is for preparing ultrafine silica by leaching a silicate ore using hydrogen chloride gas includes a raw ore feeding apparatus, an ejector, a stirred tank, and a solid-liquid separation apparatus, a liquid inlet, a liquid outlet, and a gas inlet are arranged on the ejector;

a circulated material outlet of the stirred tank is connected with the liquid inlet of the ejector through a circulation pipe;

the liquid outlet of the ejector is connected with a circulated material inlet of the stirred tank;

a material outlet of the raw ore feeding apparatus is connected with the circulation pipe;

a circulation pump is arranged on the circulation pipe; and the circulated material outlet of the stirred tank is connected with the solid-liquid separation apparatus.

In the system, a connection between the material outlet of the raw ore feeding apparatus and the circulation pipe is close to an end of the ejector.

In the system, the stirred tank includes at least one circulated material inlet, at least one circulated material outlet, and at least one material discharge port.

In the system, the raw ore feeding apparatus includes a quantitative powder conveying apparatus;

the quantitative powder conveying apparatus is connected with the circulation pipe through a feeding pipe; and the quantitative powder conveying apparatus adds powders of a raw silicate ore to the circulation pipe through the feeding pipe, and the powders are mixed with materials in the circulation pipe.

In the system, the raw ore feeding apparatus further includes a premixing tank connected with the quantitative powder conveying apparatus;

a slurry outlet of the premixing tank is connected with the ejector and a slurry inlet of the premixing tank is connected with the circulation pipe; and some of the materials in the circulation pipe are imported into the premixing tank through the circulation pump, so that the materials are premixed with the added powders of the silicate ore; a slurry obtained after the premixing is input into the ejector through the slurry outlet.

In the system, a steam outlet is arranged on the stirred tank, and is used to discharge vapor obtained through vaporization and a small amount of unreacted hydrogen chloride gas.

Preferably, the steam outlet is connected with the circulation pipe through a cooling water pipe, a heat exchanger is arranged on the cooling water pipe, and is used to condense the vapor and the small amount of unreacted hydrogen chloride gas and return the condensed vapor and the condensed unreacted hydrogen chloride gas to the ejector. At the same time, some reaction heat can be removed and a reaction temperature remains stable.

In the system, the solid-liquid separation apparatus may be a sedimentation separator, a hydro-cyclone, a centrifuge or a filter separator.

The present disclosure further provides a method for preparing ultrafine silica, including a step of: adding hydrogen chloride gas to a slurry of a silicate ore, to obtain the ultrafine silica through a reaction.

Specifically, the ultrafine silica can be prepared by using the system in the present disclosure, and the following steps are included:

pumping powders of the silicate ore into the ejector after the powders are mixed with the circulation liquid conveyed by the circulation pipe by using the raw ore feeding apparatus; sucking the hydrogen chloride gas into the ejector through the gas inlet on the ejector, dissolving the hydrogen chloride gas in the circulation liquid, and obtaining the silica through a reaction between hydrochloric acid and the silicate ore, where the reaction is sequentially performed in the ejector, the circulation pipe and the stirred tank (an initial contact reaction is performed in the ejector, and then a reaction liquid enters the circulation pipe and the stirred tank for a further reaction); and the circulation liquid is a slurry (at a beginning of the reaction) formed by the silicate ore and water or the reaction liquid obtained after the hydrochloric acid reacts with the silicate ore.

Some circulated materials are used in the present disclosure for the following purposes: First, some circulated materials flow through the ejector, to form negative pressure in the ejector and suck the hydrogen chloride gas, so that the hydrogen chloride gas can be pressurized without a compressor. Second, unreacted calcium silicate in the circulated materials quickly reacts with the hydrogen chloride gas in the ejector and a pipe after the ejector. At this time, the hydrogen chloride gas has high concentration, is quickly mixed in a pipe, and has a high reaction rate.

In the present disclosure, the negative pressure is formed in the ejector by using the Venturi effect, so that the hydrogen chloride gas is sucked into the ejector and then reacts with the silicate ore, to leach the silica.

In the preparation method, the silicate ore may be at least one of feldspar (orthoclase, plagioclase, and feldspathoid), mica, olivine, garnet, andalusite, epidote, pyroxene, hornblende, wollastonite, talcum, kaolinite, chlorite and serpentine;

a particle size of the powders of the silicate ore is not less than 50 mesh based on the Tyler standard screen;

a mass content of $SiO_2$ in the silicate ore is not less than 40%;

a difference between pressure of hydrogen chloride gas at the gas inlet of the ejector and pressure in the stirred tank is not greater than a maximum vacuum degree that the ejector can reach, such as 3.3 kPa;

a temperature of the reaction in the stirred tank may be 70° C. to 120° C.; and a ratio of a volume flow rate of the circulation liquid in the ejector to a volume flow rate of the hydrogen chloride gas may be 2:1 to 3.5:1.

In the preparation method, continuously adding the powders of the silicate ore to the ejector to implement a continuous preparation of the ultrafine silica.

Specific operations are as follows: the hydrogen chloride gas is sucked into the ejector through the gas inlet of the ejector, the hydrogen chloride gas is dissolved in the circulation liquid, and initially reacts with the powders of the silicate ore in the circulation liquid, then the reaction liquid enters the stirred tank for a further reaction. Some of the slurry in the stirred tank is discharged into the solid-liquid separation apparatus for a solid-liquid separation operation, to obtain the ultrafine silica. Some of the slurry enters the circulation pipe through the circulation pump for circulation.

A molar ratio of the hydrogen chloride gas to the silicate ore may be 2:1 to 3:1, and the number of the silicate ores is calculated based on $SiO_2$.

In the preparation method, directly adding the powders of the silicate ore to the stirred tank to form a slurry with water; inputting the slurry into the ejector through the circulation pipe; and dissolving the hydrogen chloride gas sucked into the ejector in the slurry, and obtaining the silica through the reaction between the hydrochloric acid and the silicate ore, so that implementing a batch preparation of the ultrafine silica.

A molar ratio of the hydrogen chloride gas to the silicate ore is 2:1 to 2.5:1, and the number of silicate ores is calculated based on $SiO_2$.

The principle of the present disclosure is to leach the silicate ore when the hydrochloric acid exists, so that soluble chloride salt is formed in a leaching solution. A reaction mechanism of ore leaching is a multi-phase reaction that occurs at a two-phase (which means a solid phase and a liquid phase) interface. A leaching process is divided into two stages. Leaching on an ore surface occurs in a first stage, and pore diffusion leaching occurs in a second stage. The former has a quick leaching reaction and consumes a short time. The latter has a slow reaction and consumes a long time.

Based on the system and method for preparing ultrafine silica by leaching a silicate ore using hydrogen chloride gas in the present disclosure, an industrially feasible solution for preparing silica by continuously leaching a silicate ore is provided. In addition, By means of using the ejector and employing a manner of directly dissolving the hydrogen chloride gas in a circulation silicate slurry, shortly after the hydrogen chloride gas comes into contact with the circulation slurry, a nearly saturated hydrochloric acid solution is formed, so that a leaching reaction is more easily performed. In addition, dissolution heat can be supplied for the leaching process. Moreover, because of initial contact of the slurry with high concentration and high dispersibility in the ejector and a high-concentration hydrochloric acid solution, the dissolution efficiency of ores and the utilization of hydrochloric acid are greatly increased.

1 Dust collector, 2 Material storage tank, 3 Quantitative powder conveying apparatus, 4 Ejector, 5 Circulation pump, 5' Slurry pump, 6 Stirred tank, 7 solid-liquid separation apparatus, 8 Circulation pipe, 9 Heat exchanger, 10 Cooling water pipe.

DESCRIPTION OF THE EMBODIMENTS

Unless otherwise specified, experimental methods used in the following embodiments are all conventional methods.

Unless otherwise specified, materials, reagents, and the like used in the following embodiments can be commercially obtained.

Embodiment 1

Figure 1:
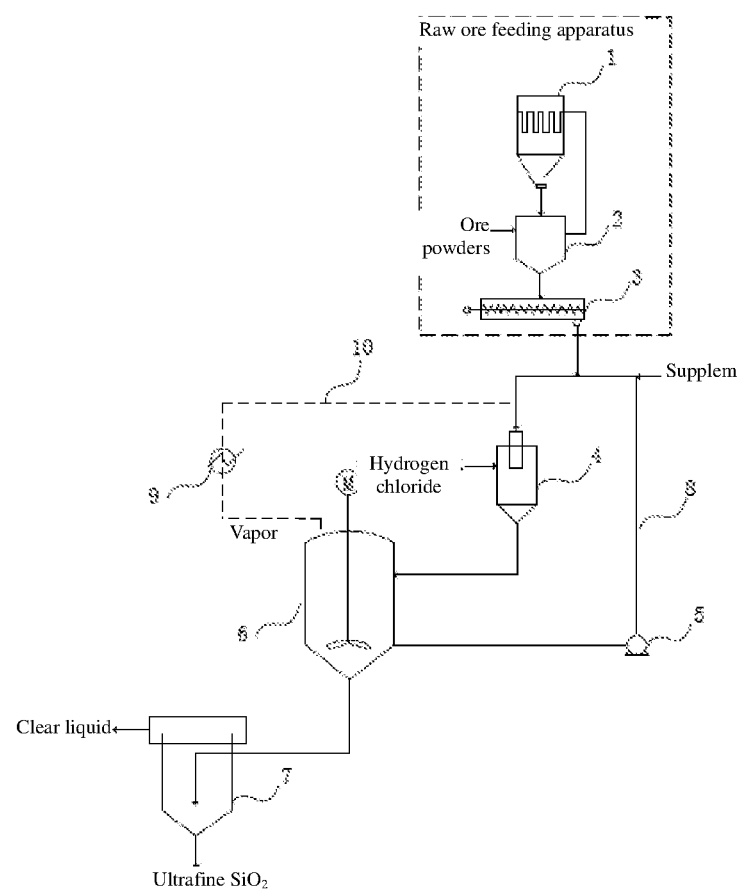
FIG. 1 is a schematic diagram of a system for preparing ultrafine silica by leaching a silicate ore using hydrogen chloride gas according to Embodiment 1 of the present disclosure.

FIG. 1 is a schematic diagram of a preparation system according to a first embodiment of the present disclosure. The system includes a raw ore feeding apparatus, an ejector 4, a stirred tank 6, and a solid-liquid separation apparatus 7. The raw ore feeding apparatus includes a dust collector 1, a material storage tank 2, and a quantitative powder conveying apparatus 3 that are connected in turn. A liquid inlet (not marked in the figure), a liquid outlet (not marked in the figure), and a gas inlet (not marked in the figure) are arranged on the ejector 4. A circulation pipe 8 is connected between the liquid inlet of the ejector 4 and a material discharge port of the stirred tank 6, and the liquid outlet of the ejector 4 is connected with a circulated material inlet of the stirred tank 6. The quantitative powder conveying apparatus 3 adds powders of a raw silicate ore to the circulation pipe 8 through a feeding pipe, and the powders are mixed with materials in the circulation pipe 8. The material discharge port of the stirred tank 6 is connected with the solid-liquid separation apparatus 7. A circulation pump 5 is arranged on the circulation pipe 8, and is used to pump a circulation liquid.

In the preparation system in the present disclosure, a steam outlet (not marked in the figure) is arranged on the stirred tank 6, and is used to discharge vapor obtained through vaporization and a small amount of unreacted hydrogen chloride gas. The steam outlet is connected with the circulation pipe 8 through a cooling water pipe 10. A heat exchanger 9 is arranged on the cooling water pipe 10, and is used to condense the vapor and the small amount of unreacted hydrogen chloride gas and return the condensed vapor and the condensed unreacted hydrogen chloride gas to the ejector 4. At the same time, some reaction heat can be removed and a reaction temperature remains stable.

In the preparation system in the present disclosure, the solid-liquid separation apparatus 7 may be a sedimentation separator, a hydro-cyclone, a centrifuge or a filter separator.

A working process of the preparation system according to the first embodiment of the present disclosure is as follows: Continuous operations are performed. Powders of a raw ore that are conveyed to the material storage tank 2 are continuously added to the circulation pipe 8 by using the quantitative powder conveying apparatus 3 and are mixed with the circulation liquid to form a slurry; the slurry is driven into the ejector 4 at a high speed; negative pressure is formed in the ejector by using the Venturi effect, so that hydrogen chloride gas is sucked for an initial contact reaction; then a reaction liquid enters the stirred tank 6 for a further reaction; some of the slurry reacted in the stirred tank is discharged into the solid-liquid separation apparatus 7 for a solid-liquid separation operation, and some is pumped as a circulation liquid by the circulation pump 5 into the circulation pipe 8.

In a specific embodiment, the following process conditions are selected: An active ingredient of the powders of the raw ore is CaSiO3, a reaction temperature of the stirred tank is 120° C., a temperature of the hydrogen chloride gas is 250° C., and a ratio of a molar flow rate of the hydrogen chloride gas to a molar flow rate of $CaSiO_3$ is 2:1. Data that is of a material balance and a heat balance and that is obtained through Aspen simulation is shown in Table 1.

TABLE 1

Data of a material balance and a heat balance

| Material flow | | Temperature (° C.) | Flow (kmol/h) | Composition (%, mol) | Enthalpy value (cal/mol) |
|---|---|---|---|---|---|
| Ejector inlet | $CaSiO_3$ | 20 | 1 | 3.62 | −390601 |
| | HCl | 250 | 2 | 7.23 | −20494 |
| | $H_2O$ | 20 | 15 | 54.27 | −68402 |
| | Circulation $H_2O$ | 120 | 8.64 | 31.26 | −67505 |
| | liquid $CaCl_2$ | 120 | 1 | 3.62 | |
| Ejector outlet | $CaSiO_3$ | 105 | 1 | 3.62 | −71767 |
| | HCl | 105 | 2 | 7.23 | |
| | $H_2O$ | 105 | 23.64 | 85.53 | |
| | $CaCl_2$ | 105 | 1 | 3.62 | |
| Vapor phase outlet of the stirred tank | $H_2O$ | 120 | 7.36 | 100 | −57042 |
| Liquid phase outlet of the stirred tank | $H_2O$ | 120 | 8.64 | 81.2 | −67505 |
| | $CaCl_2$ | 120 | 1 | 9.4 | |
| | $SiO_2$ | 120 | 1 | 9.4 | −216404 |
| Outlet of a clear liquid obtained through solid-liquid separation | $H_2O$ | 120 | 7.78 | 89.63 | −67505 |
| | $CaCl_2$ | 120 | 0.9 | 10.37 | |
| Outlet of a solid residue obtained through solid-liquid separation | $H_2O$ | 120 | 0.86 | 43.88 | −67505 |
| | $CaCl_2$ | 120 | 0.1 | 5.1 | |
| | $SiO_2$ | 120 | 1 | 51.02 | −216404 |

In a specific example, wollastonite is used as an example of the silicate ore in this example. Wollastonite comes from Shanggao, Jiangxi and has a particle size of 200 mesh (based on the Tyler standard screen). An average ore composition is shown in Table 2.

TABLE 2

Average ore composition of wollastonite (%)

| ω (calcium silicate) | ω (calcium carbonate) | ω (diopside) | ω (quartz) | ω (garnet) |
|---|---|---|---|---|
| 94.1 | 1.24 | 0.86 | 2.37 | 0.96 |

In a specific example, a volume of the material storage tank is 4 m³, and a screw feeder is selected as the quantitative powder conveying apparatus. A volume of the stirred tank is 4 m³, a rotation speed is 30 rpm, a number of added wollastonite powders is 110 kg/h, and an amount of added water is 880 kg/h, and a flow rate of hydrogen chloride gas is controlled to be 45 m³/h (a molar ratio of the hydrogen chloride gas to the wollastonite powders is 2:1, and the amount of the wollastonite powders is calculated based on $SiO_2$). A temperature of the stirred tank is set to 80° C., a stay time is 2 h, and a circulation flow rate is 100 kg/h. After sedimentation, a solid residue is further washed, filtered and dried to obtain ultrafine $SiO_2$. Technical indicators are shown in Table 3.

TABLE 3

Technical indicators of ultrafine $SiO_2$ prepared by using powders of a wollastonite ore

| | |
|---|---|
| Silica % | 95 |
| Heat loss % | 5.8 |
| Loss on ignition % | 5.1 |
| DBP absorption value/ml/g | 2.98 |
| BET specific surface area/m²/g | 198 |
| pH | 6.4 |
| Average particle size/um | 10.5 |
| Iron/ppm | 180 |

In a specific example, serpentine is used as an example of the silicate ore in this example. Serpentine comes from Xinyang, Henan and has a particle size of 200 mesh (based on the Tyler standard screen). An average ore composition is shown in Table 4.

TABLE 4

Average ore composition of serpentine (%)

| ω (magnesium oxide) | ω (silica) | ω (water) |
|---|---|---|
| 44.3 | 44.1 | 12.9 |

In a specific example, a volume of the material storage tank is 4 m³, and a screw feeder is selected as the quantitative powder conveying apparatus. A volume of the stirred tank is 4 m³, a rotation speed is 30 rpm, a number of added serpentine powders is 91 kg/h, and an amount of added water is 880 kg/h, and a flow rate of the hydrogen chloride gas is controlled to be 45 m³/h (a molar ratio of the hydrogen chloride gas to the serpentine powders is 2:1, and the amount of the serpentine powders is calculated based on $SiO_2$). A temperature of the stirred tank is set to 120° C., a stay time is 2 h, and a circulation flow rate is 100 kg/h. After sedimentation, a solid residue is further washed, filtered, dried, and smashed to obtain ultrafine $SiO_2$. Technical indicators are shown in Table 5.

TABLE 5

Technical indicators of ultrafine $SiO_2$ prepared by using powders of a serpentine ore

| | |
|---|---|
| Silica % | 95.8 |
| Heat loss % | 5.36 |
| Loss on ignition % | 6.21 |
| DBP absorption value/ml/g | 2.86 |
| BET specific surface area/m²/g | 188 |
| pH | 6.35 |
| Average particle size/um | 14.1 |
| Iron/ppm | 182 |

Embodiment 2

Figure 2:
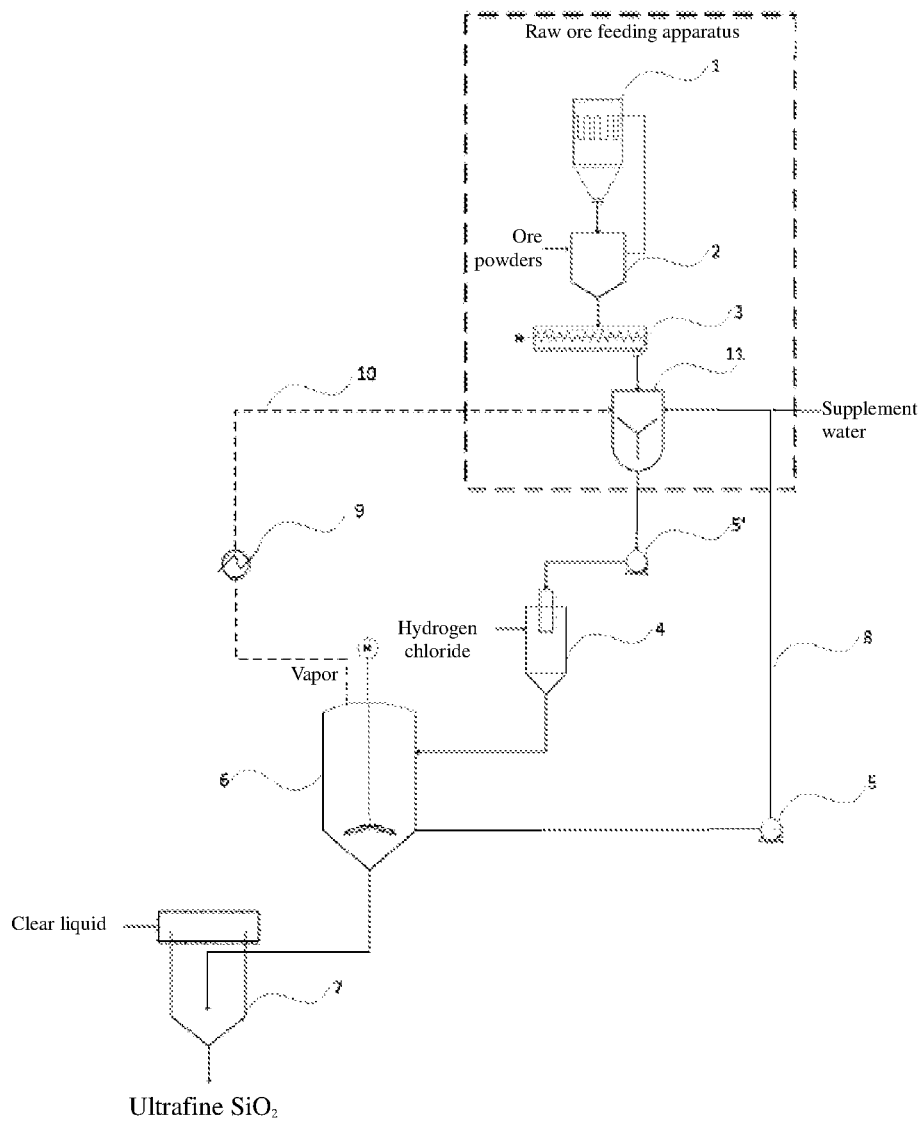
FIG. 2 is a schematic diagram of a system for preparing ultrafine silica by leaching a silicate ore using hydrogen chloride gas according to Embodiment 2 of the present disclosure.

FIG. 2 is a schematic diagram of a preparation system according to a second embodiment of the present disclosure. A structure of the preparation system is basically the same as the system shown in FIG. 1. Differences are as follows: A raw ore feeding apparatus further includes a premixing tank 11 connected with a quantitative powder conveying apparatus 3, a slurry outlet of the premixing tank 11 is connected with an ejector 4 and a slurry inlet of the premixing tank 11 is connected with a circulation pipe 8, and some of materials in the circulation pipe 8 are imported into the premixing tank 11 through a circulation pump 5, so that the materials are premixed with added powders of a silicate ore. A slurry obtained after the premixing is input into the ejector 4 through the slurry outlet. A slurry pump 5' is arranged on a pipe through which the premixing tank 11 is connected with the ejector 4.

A working process of the preparation system according to the second embodiment of the present disclosure is as follows: Continuous operations are performed. Powders of a raw ore that are conveyed to a material storage tank 2 are continuously added to the premixing tank 11 by using the quantitative powder conveying apparatus 3 and are uniformly mixed with a specific amount of water through stirring to form a slurry; the slurry is driven into the ejector 4 through the slurry pump 5' at a high speed; negative pressure is formed in the ejector by using the Venturi effect, so that hydrogen chloride gas is sucked for an initial contact reaction; then a reaction liquid enters a stirred tank 6 for a further reaction; some of the slurry reacted in the stirred tank is discharged into the solid-liquid separation apparatus 7 for a solid-liquid separation operation, and some is pumped as a circulation liquid by the circulation pump 5 into the circulation pipe 11 through the circulation pipe 8.

In a specific example, wollastonite is used as an example of the silicate ore in this example. Wollastonite comes from Shanggao, Jiangxi and has a particle size of 200 mesh (based on the Tyler standard screen). An average ore composition is shown in Table 2.

In a specific example, a volume of the material storage tank is 4 m³, and a screw feeder is selected as the quantitative powder conveying apparatus. A volume of the premixing tank is 3 m³, a volume of the stirred tank is 4 m³, a rotation speed is 30 rpm, a number of added wollastonite powders is 110 kg/h, and an amount of added water is 880 kg/h, and a flow rate of the hydrogen chloride gas is controlled to be 45 m³/h (a molar ratio of the hydrogen chloride gas to the wollastonite powders is 2:1, and the amount of the wollastonite powders is calculated based on $SiO_2$). A temperature of the stirred tank is set to 80° C., a stay time is 2 h, and a circulation flow rate is 100 kg/h. After sedimentation, a solid residue is further washed, filtered and dried to obtain ultrafine $SiO_2$. Technical indicators are shown in Table 6.

TABLE 6

Technical indicators of ultrafine $SiO_2$ prepared by using powders of a wollastonite ore

| | |
|---|---|
| Silica % | 96.3 |
| Heat loss % | 5.76 |
| Loss on ignition % | 5.24 |
| DBP absorption value/ml/g | 2.85 |
| BET specific surface area/m²/g | 214 |
| pH | 6.31 |
| Average particle size/um | 12.9 |
| Iron/ppm | 182 |

In a specific example, wollastonite is still used as an example of the silicate ore in this example. Wollastonite comes from Shanggao, Jiangxi and has a particle size of 200 mesh (based on the Tyler standard screen). An average ore composition is shown in Table 2.

In a specific example, intermittent operations are performed. 110 kg of wollastonite powders are added to the stirred tank, 880 kg of water are added, and a flow rate of hydrogen chloride gas is controlled to be 45 m³/h (a molar ratio of the hydrogen chloride gas to the wollastonite powders is 2:1, and an amount of the wollastonite powders is calculated based on $SiO_2$). A temperature of the stirred tank is set to 80° C., a reaction time is 1 h, and a circulation flow rate is 100 kg/h. After sedimentation, a solid residue is further washed, filtered and dried to obtain ultrafine $SiO_2$. Technical indicators are shown in Table 7.

TABLE 7

Technical indicators of ultrafine $SiO_2$ prepared through intermittent operations

| | |
|---|---|
| Silica % | 95.5 |
| Heat loss % | 5.72 |
| Loss on ignition % | 5.19 |
| DBP absorption value/ml/g | 2.95 |
| BET specific surface area/m²/g | 189 |
| pH | 6.4 |
| Average particle size/um | 14.1 |
| Iron/ppm | 180 |

It should be noted that, according to common knowledge of a person of ordinary skill in the art, corresponding measurements such as a temperature measurement and a liquid level measurement, a control system, and a corresponding valve are further set on a decomposition reactor and a regeneration reactor, and are not indicated in the accompanying drawings one by one. This does not mean that the conventional designs are not included in the process of the present disclosure. It is also a conventional design common to a person of ordinary skill in the art that a feed rate of raw materials in the present disclosure is adjusted based on a conversion rate and a material balance, and the conventional designs are also not indicated in the present disclosure one by one. This does not mean that the conventional design is not included in the process of the present disclosure.

In accordance with the embodiments of the present disclosure, as described above, the embodiments are not described in detail, and are not intended to limit the present disclosure to be only the described specific embodiments. Obviously, many modifications and variations are possible in light of the forgoing description. The embodiments have been selected and described in detail to better explain the principle and actual application of the present disclosure, so that a person skilled in the art can take full advantage of the present disclosure and a use modified based on the present disclosure.

What is claimed is:

1. A system for preparing ultrafine silica by leaching a silicate ore using hydrogen chloride gas, comprising a raw ore feeding apparatus, an ejector, a stirred tank, and a solid-liquid separation apparatus, wherein
a liquid inlet, a liquid outlet, and a gas inlet are arranged on the ejector;
a circulated material outlet of the stirred tank communicates with the liquid inlet of the ejector through a circulation pipe;
the liquid outlet of the ejector communicates with a circulated material inlet of the stirred tank;
a material outlet of the raw ore feeding apparatus communicates with the circulation pipe;
a circulation pump is arranged on the circulation pipe; and
the circulated material outlet of the stirred tank communicates with the solid-liquid separation apparatus,
a steam outlet is arranged on the stirred tank,
the steam outlet communicates with the circulation pipe through a cooling water pipe, and a heat exchanger is arranged on the cooling water pipe.

2. The system according to claim 1, wherein the raw ore feeding apparatus comprises a quantitative powder conveying apparatus; and
the quantitative powder conveying apparatus is connected with the circulation pipe through a section of feeding pipe.

3. The system according to claim 2, wherein the raw ore feeding apparatus further comprises a premixing tank connected with the quantitative powder conveying apparatus; and
a slurry outlet of the premixing tank is communicated with the ejector, and a slurry inlet of the premixing tank is connected with the circulation pipe.

4. The system according to claim 1 wherein the solid-liquid separation apparatus is a sedimentation separator, a hydro-cyclone, a centrifuge or a filter separator.

5. A method for preparing ultrafine silica, wherein the ultrafine silica is prepared by using the system according to claim 1, and the method comprises steps of:
pumping powders of the silicate ore into the ejector after the powders are mixed with circulation liquid conveyed by the circulation pipe by using the raw ore feeding apparatus;
sucking the hydrogen chloride gas into the ejector through the gas inlet on the ejector, dissolving the hydrogen chloride gas in the circulation liquid to obtain hydrochloric acid, and obtaining the silica through a reaction between the hydrochloric acid and the silicate ore, wherein the reaction is sequentially performed in the ejector, the circulation pipe and the stirred tank; and
the circulation liquid is a slurry formed by the silicate ore and water or a reaction liquid obtained after the hydrochloric acid reacts with the silicate ore.

6. The preparation method according to claim 5, wherein the silicate ore is at least one of feldspar, mica, olivine, garnet, andalusite, epidote, pyroxene, hornblende, wollastonite, talcum, kaolinite, chlorite and serpentine;
a particle size of the powders of the silicate ore is not less than 50 mesh;
a mass content of $SiO_2$ in the silicate ore is not less than 40%;
a temperature of the reaction in the stirred tank is 70° C. to 120° ° C.; and
a ratio of a volume flow rate of the circulation liquid in the ejector to the hydrogen chloride gas is 2:1 to 3.5:1, the volume flow rate is a volume of fluid that is passing through a cross sectional area per unit time.

7. The preparation method according to claim 5, wherein pumping powders of the silicate ore into the ejector comprises: continuously adding the powders of the silicate ore to the ejector.

8. The preparation method according to claim 5, wherein pumping powders of the silicate ore into the ejector comprises: directly adding the powders of the silicate ore to the stirred tank to form a slurry with water, wherein the water enters the stirred tank through the liquid inlet of the ejector or a slurry inlet of a premixing tank connected with the ejector; and inputting the slurry into the ejector through the circulation pipe;
wherein the hydrogen chloride gas sucked into the ejector is dissolved in the slurry, and the silica is obtained through the reaction between the hydrochloric acid and the silicate ore in the stirred tank.

* * * * *